US011927921B2

(12) United States Patent
Oberson

(10) Patent No.: US 11,927,921 B2
(45) Date of Patent: Mar. 12, 2024

(54) OSCILLATING WINDING MASS PROVIDED WITH A DECORATIVE ELEMENT FOR AUTOMATIC TIMEPIECE MOVEMENT

(71) Applicant: The Swatch Group Research and Development Ltd, Marin (CH)

(72) Inventor: Loïc Oberson, Morges (CH)

(73) Assignee: The Swatch Group Research and Development Ltd, Marin (CH)

( * ) Notice: Subject to any disclaimer, the term of this patent is extended or adjusted under 35 U.S.C. 154(b) by 306 days.

(21) Appl. No.: 17/161,008

(22) Filed: Jan. 28, 2021

(65) Prior Publication Data

US 2021/0278804 A1 Sep. 9, 2021

(30) Foreign Application Priority Data

Mar. 9, 2020 (EP) .................................... 20161893

(51) Int. Cl.
*G04B 5/16* (2006.01)

(52) U.S. Cl.
CPC ..................................... *G04B 5/16* (2013.01)

(58) Field of Classification Search
CPC ........................................................ G04B 5/16
See application file for complete search history.

(56) References Cited

U.S. PATENT DOCUMENTS 4,822,694 A * 4/1989 Randin ................... C04B 41/83 427/244
5,805,535 A * 9/1998 Guyard .............. G04B 37/0033 368/282
6,354,731 B1 * 3/2002 Halter ...................... G04B 5/18 368/169
2012/0024432 A1 * 2/2012 Bazin ....................... B21J 1/006 148/516
2012/0195173 A1 * 8/2012 Poffet .................... G04B 5/165 368/208
2014/0153372 A1 6/2014 Kasapi et al.
2015/0362892 A1 * 12/2015 Zaugg .................... G04C 5/005 368/168

(Continued)

FOREIGN PATENT DOCUMENTS

CH 288 208 A 1/1953
CH 703 577 A2 1/2012
CH 712 108 A1 8/2017

(Continued)

OTHER PUBLICATIONS

N. Tirole, Translation of WO2014114379, original published Jul. 31, 2014.*
European Search Report for EP 20 16 1893 dated Aug. 20, 2020.

*Primary Examiner* — Renee S Luebke
*Assistant Examiner* — Matthew Hwang
(74) *Attorney, Agent, or Firm* — Sughrue Mion, PLLC

(57) ABSTRACT

The main element 2 is connected to the mechanism of the movement, having parts 4, 5, by an arbor about which it can turn. To this end, it comprises an attachment 6 for fixing to the movement, which is for example formed by a small ring arranged in the opening 9 of the ring of the main element 2. The attachment 6 is thus composed of the same material as the main element and is arranged in the same plane. By virtue of the attachment 6, the winding mass can make a circular movement about the arbor, when it oscillates.

13 Claims, 1 Drawing Sheet

(56) References Cited

U.S. PATENT DOCUMENTS

| | | | | |
|---|---|---|---|---|
| 2016/0059452 | A1 | 3/2016 | Strahm et al. | |
| 2019/0018367 | A1* | 1/2019 | Rachdi | G04B 5/16 |

FOREIGN PATENT DOCUMENTS

| | | | |
|---|---|---|---|
| CN | 101174131 | A | 5/2008 |
| CN | 202 472 252 | U | 10/2012 |
| CN | 104487904 | A | 4/2015 |
| EP | 1 918 789 | A1 | 5/2008 |
| FR | 2 312 809 | A1 | 12/1976 |
| JP | 58-28682 | A | 2/1983 |
| JP | 2006-38713 | A | 2/2006 |
| JP | 2016-507754 | A | 3/2016 |
| WO | 2014/114379 | A1 | 7/2014 |

* cited by examiner

OSCILLATING WINDING MASS PROVIDED WITH A DECORATIVE ELEMENT FOR AUTOMATIC TIMEPIECE MOVEMENT

CROSS REFERENCE TO RELATED APPLICATION

This application claims priority to European Patent Application No. 20161893.1 filed Mar. 9, 2020, the entire contents of which are incorporated herein by reference.

FIELD OF THE INVENTION

The present invention relates to an oscillating winding mass provided with a decorative element for a movement of an automatic-movement timepiece. More particularly, the invention relates to such a winding mass intended to equip a wristwatch including a transparent back.

BACKGROUND OF THE INVENTION

Wristwatches having cases with a transparent back to enable the movement thereof to be observed are already known. However, when such watches include an automatic-winding movement, the oscillating winding mass conceals a movement part.

Furthermore, the aesthetics of such oscillating masses is not always pleasant, even if it is possible to etch the material forming the oscillating mass in order to make it more attractive. It is possible, for example, to etch a decorative element, such as a logo representing the make of the watch. However, this logo is in general not sufficiently conspicuous for the result to be aesthetically convincing. Furthermore, a simple colouring of the logo does not suffice to make the mass more aesthetic, not to mention the fact that the colour may degrade over time. In addition, observing the movement is always truncated by the presence of the oscillating winding mass, which prevents comfortable observation of the movement.

SUMMARY OF THE INVENTION

The aim of the present invention is to remedy the drawbacks of the prior art by proposing an oscillating winding mass for a timepiece including a particular decorative element. The decorative element makes it possible in particular to discern the movement.

To this end, the object of the invention is an oscillating winding mass of a movement of a timepiece, said oscillating winding mass being intended to be mounted for rotation on an arbor of the movement, said mass comprising a main element conferring the general form of the oscillating winding mass, a heavy part allowing oscillation of the mass in response to the movement of the timepiece and to the force of gravity.

The invention is remarkable in that it comprises a decorative element, for example a logo or initials, the decorative element being fixed to the main element, the decorative element being held by at least one end embedded in the material of the main element.

By virtue of this novel winding mass structure, a decorative element is held by the main element of the winding mass partly in the mass of the main element. Thus the winding mass has an aesthetic rendering that is more attractive than a conventional winding mass known from the prior art. This is because the decorative element, which may represent a logo or initials of a brand, gives more style to the winding mass and therefore to the timepiece.

According to a particular embodiment of the invention, the main element comprising two superimposed parts attached one to the other, the decorative element is held by the end between the superimposed parts of the main element.

According to a particular embodiment of the invention, the main element is in a single piece.

According to a particular embodiment of the invention, the main element comprises a through opening, the decorative element being arranged at least partly in said opening.

According to a particular embodiment of the invention, the main element comprises amorphous or at least partially amorphous metal, preferably in full.

According to a particular embodiment of the invention, the decorative element comprises amorphous or at least partially amorphous metal, preferably in full.

According to a particular embodiment of the invention, the decorative element comprises metallic foam.

According to a particular embodiment of the invention, the heavy part comprises high-density amorphous or at least partially amorphous metal, preferably in full.

According to a particular embodiment of the invention, the heavy part is an insert moulded in the main element.

According to a particular embodiment of the invention, the main element is in the form of a ring.

According to a particular embodiment of the invention, the decorative element comprises a second end held between the two parts.

According to a particular embodiment of the invention, the decorative element at least partially passes through the ring.

According to a particular embodiment of the invention, the main element comprises an attachment for fixing to the movement.

The invention also relates to a timepiece including a case formed by a middle closed by a glass and an at least partially transparent back wherein an automatic-winding timepiece movement is housed, said movement being equipped with an oscillating winding mass according to the invention.

The invention also relates to a method for manufacturing an oscillating winding mass, said oscillating winding mass being intended to be mounted for rotation on an arbor of the movement, said mass comprising a main element conferring the general form of the oscillating winding mass, a heavy part allowing the oscillation of the mass in response to the movement of the timepiece and to the force of gravity, characterised in that the method comprises a first step of manufacture of a main element of the mass in two superimposable parts, a second step of manufacturing a decorative element, for example a logo or initials, and a third step of assembling the main element and the decorative element, the decorative element being held between the two parts by at least one end.

According to a particular embodiment of the invention, the method comprises a step wherein a metallic foam is formed in order to obtain the decorative element, the decorative element being made from amorphous or at least partially amorphous metal.

According to a particular embodiment of the invention, the method comprises a formation step wherein a metal plate is formed provided with an open pattern in order to obtain the decorative element, the decorative element being made from amorphous or at least partially amorphous metal.

According to a particular embodiment of the invention, the two parts of the main element and the decorative element are assembled by a hot thermoforming method of the hot-forming type, or by insert moulding.

BRIEF DESCRIPTION OF THE DRAWINGS

Other details of the invention will emerge more clearly from a reading of the following description given with reference to the accompanying drawings, wherein.

DETAILED DESCRIPTION OF A PREFERRED EMBODIMENT

Figure 1:
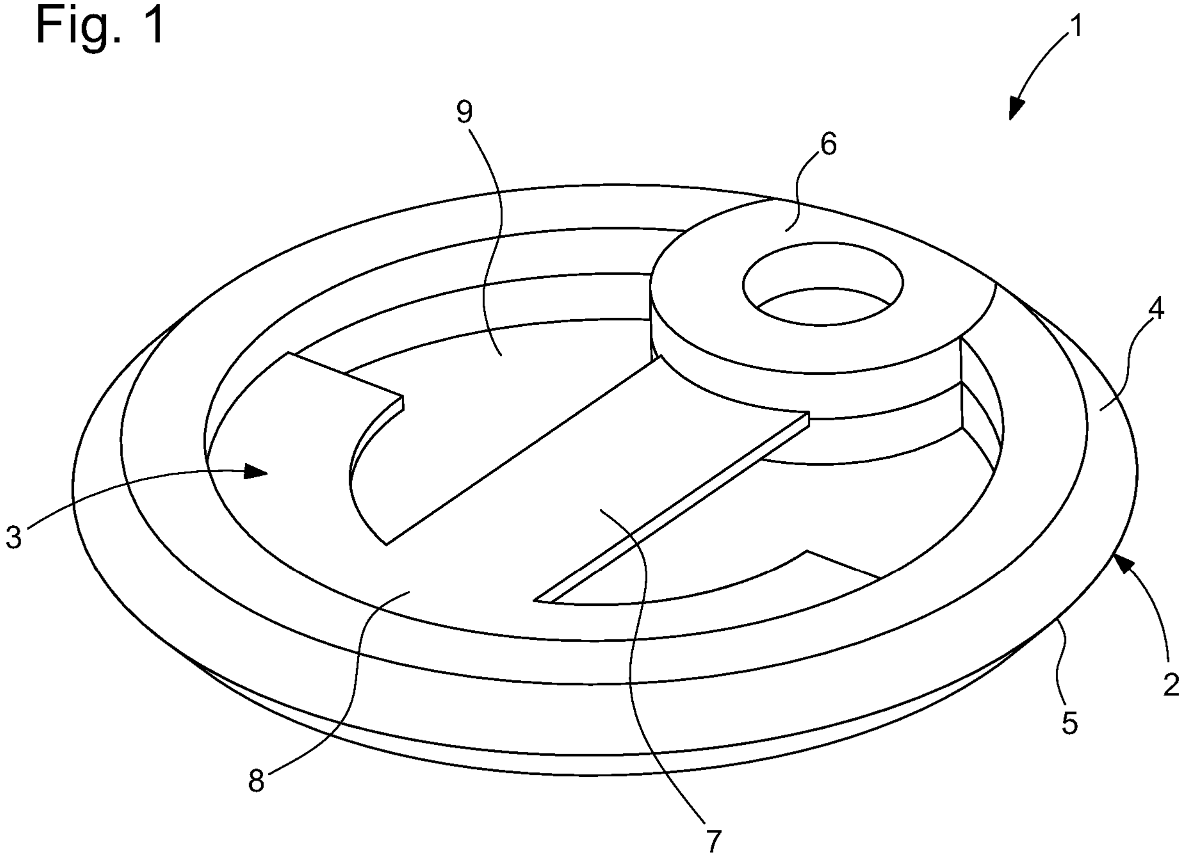
FIG. 1 is a perspective view of an embodiment of an oscillating winding mass according to the invention.

FIG. 1 shows a first embodiment of an oscillating winding mass according to the invention, designated by the general reference 1. This mass 1 is intended to equip the automatic-winding movement of a timepiece in a conventional manner, the timepiece including in particular a case formed by a middle closed by a glass and an at least partially transparent back in order to make the movement visible from the back, and which are not shown in the figures.

The winding mass 1 comprises a main element 2 conferring the general form of the oscillating winding mass 1. The main element 2 is formed by a ring. The main element 2 includes a through opening 9 formed by the ring.

The main element 2 comprises a first material, preferably in full. The first material is amorphous metal or at least partially amorphous metal, since it makes it possible to use a hot thermoforming method of the hot-forming type.

The main element 2, having parts 4, 5, is connected to the mechanism of the movement by an arbor about which it can turn. To this end, it comprises an attachment 6 for fixing to the movement, which is for example formed by a small ring arranged in the opening 9 of the ring of the main element 2. The attachment 6 is thus composed of the same material as the main element and is arranged in the same plane. By virtue of the attachment 6, the winding mass can make a circular movement about the arbor, when it oscillates.

A part of the winding mass forms a heavy part allowing oscillation of the mass in response to the movement of the timepiece and to the force of gravity. The heavy part comprises a second material with a density greater than 10, preferably greater than or equal to 20. For example, the third material comprises tungsten or a tungsten alloy with a density substantially equal to 20, preferably in full. The heavy part is for example an insert moulded in the main element.

According to the invention, the main element 2 comprises two superimposed parts 4, 5 connected one to the other. The top part 4 and the bottom part 5 here have identical forms. In the separated position, the ring is cut in the plane. In other words, each part 4, 5 is in the form of a substantially identical flat ring, the thickness of which is less than the total thickness of the ring, preferably substantially equal to half.

Furthermore, the winding mass 1 comprises a decorative element 3, for example a logo or initials, the decorative element 3 being fixed to the main element 2 of the mass 1. The decorative element 3 is here a logo in the form of an anchor having a substantially straight segment 7 and a curved segment 8, the straight segment 7 being connected to the curved segment 8 at its middle, on the internal side of the curvature.

Figure 2:
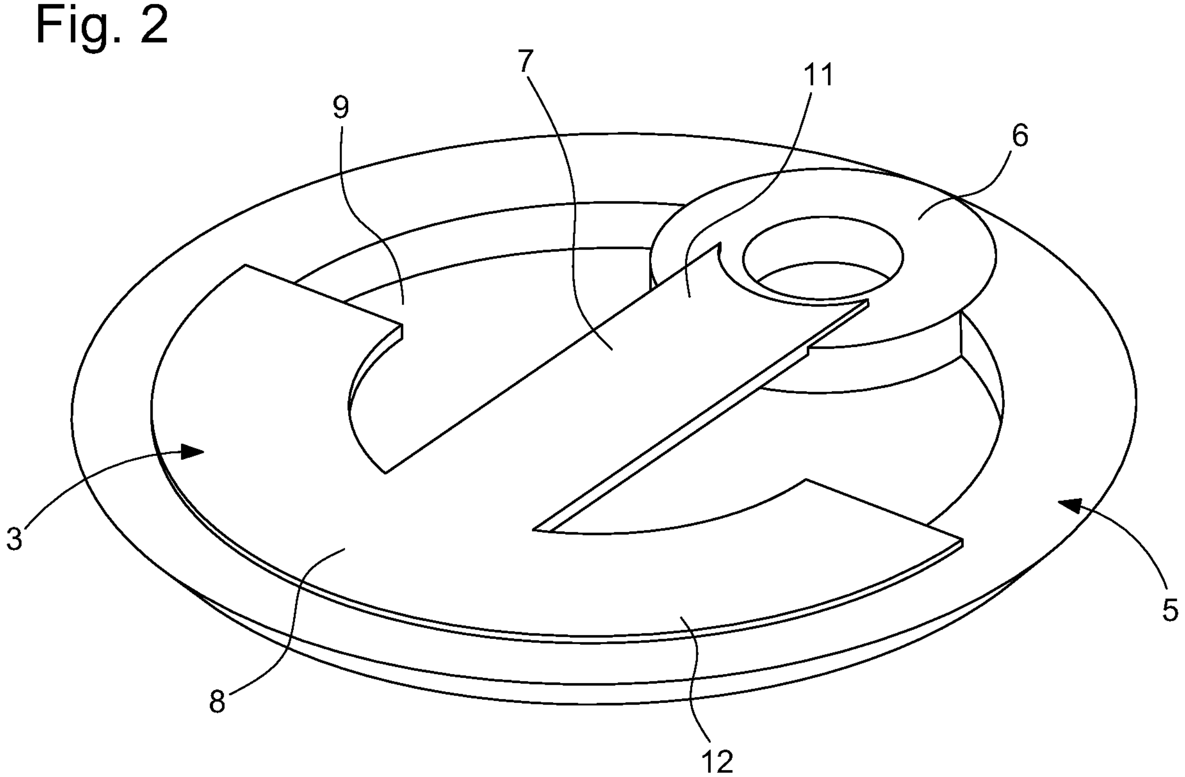
FIG. 2 is a perspective view of a part of the main element and of the decorative element of an oscillating winding mass according to the invention.

The decorative element 3 is held by at least one end 11, 12 between the superimposed parts of the main element. Thus, the ends 11, 12 are embedded in the material of the main element 2. In the example in FIGS. 1 and 2, the decorative element is held by the end 11 of the straight segment 7 and by the external side 12 of the curved segment 8. When the two parts 4, are assembled, they come into abutment on the ends 11, 12 of the decorative element. The assembly is performed for example by an insert-moulding method, or by a hot thermoforming method of the hot-forming type. Preferably the ends 11, 12 of the decorative element 3 are embedded in the material of the main element 2. Advantageously, the decorative element 3 is flat in order to enable the two parts 4, 5 to connect together more easily.

The decorative element 3 here has a length greater than the diameter of the opening 9 in order to be able to be fixed to the main element by its two ends 11, 12. Thus the decorative element 3 at least partially passes through the ring. The decorative element 3 preferably has a width less than that of the opening 9 in order to facilitate vision through the winding mass.

The decorative element 3 is formed from a third material, preferably in full. The third material is for example amorphous metal or partially amorphous metal.

In order to produce the winding mass 1, the production method comprises a first step of manufacturing a main element 2 of the mass 1 in two superimposable parts 4, 5.

The method comprises a second step of manufacturing a decorative element, for example a logo or initials.

Preferably, the material of the decorative element 3 is structured to allow vision of the mechanism through the decorative element 3. For this purpose, the decorative element 3 is perforated in a predefined pattern.

In a first embodiment, the decorative element 3 is formed in a metal sheet by laser cutting. The perforated pattern is drawn on the metal sheet by the laser. The metal sheet is next cut in order to obtain the overall form of the decorative element 3.

In a variant, it is possible to use stamping or machining to form the decorative element.

A second embodiment consists of producing the decorative element 3 from a metallic foam. To achieve that, a mould is formed, for example made from salt, the mould being a negative of the foam that it is wished to produce. Amorphous metal is used, which is infiltrated or injected into the mould. The foam obtained is next cut into plates, which are cut to the dimensions of the decorative element.

In a third step, the two parts 4, 5 of the main element 2 and the decorative element 3 are assembled by a hot thermoforming method of the hot-forming type. The decorative element 3 is disposed between the two parts 4, 5 of the main element 2, and then the assembly is heated in order to mould the two parts on the decorative element 3. This type of implementation can be done by means of the material made from amorphous metal of the main element 2 and/or of the decorative element 3. Thus the decorative element is held between the two parts by at least one end, here two.

In a variant embodiment, it is possible to mould the decorative element onto the main element, or to mould the main element onto the decorative element. Thus a main element is obtained formed from the same material, that is to say which is in a single piece.

The invention also relates to a second embodiment of an automatic winding mass, not shown in the figures. The winding mass comprises a main element formed from the same material, and a decorative element identical to that of the first embodiment. In this case, the winding mass is similar to that of the first embodiment, except that the main element is in a single piece rather than in two parts.

The invention claimed is:

1. An oscillating winding mass (1) of a movement of a timepiece, said oscillating winding mass (1) being intended to be mounted for rotation on an arbor of the movement, said mass (1) comprising a main element (2) formed as a ring conferring the overall form of the oscillating winding mass (1) and comprising an attachment (6), which is circular and is formed at a first portion of a circumferential edge of the ring, for fixing on the movement, a heavy part allowing the oscillation of the mass (1) in response to the movement of the timepiece and to the force of gravity, and a decorative element (3) fixed to the main element (2) by at least one end (11) embedded in the attachment (6) of the main element (2), the main element (2) comprising a through opening (9), the decorative element (3) being arranged at least partly in said opening (9), the main element (2) comprising two superimposed parts (4, 5) connected one to the other, the decorative element (3) is held by the end (11) between the superimposed parts (4, 5) of the main element (2).

2. The winding mass (1) according to claim 1, wherein the main element (2) comprises amorphous or at least partially amorphous metal.

3. The winding mass (1) according to claim 1, wherein the decorative element (3) comprises amorphous or at least partially amorphous metal.

4. The winding mass (1) according claim 1, wherein the decorative element (3) comprises a metallic foam.

5. The winding mass (1) according to claim 1, wherein the heavy part comprises amorphous or at least partially amorphous metal of high density.

6. The winding mass (1) according to claim 1, wherein the heavy part is an insert moulded in the main element (2).

7. The winding mass (1) according to claim 1, wherein the decorative element (3) comprises a second end (12) held between the two parts (4, 5).

8. The winding mass (1) according to claim 1, wherein the decorative element (3) at least partially overlaps the ring.

9. A timepiece including a case formed by a middle closed by a glass and an at least partially transparent back wherein an automatic-winding timepiece movement is housed, wherein said movement is equipped with an oscillating winding mass (1) according to claim 1.

10. A method for manufacturing an oscillating winding mass, said oscillating winding mass (1) being intended to be mounted for rotation on an arbor of the movement, said mass (1) comprising a main element (2) formed as a ring conferring the general form of the oscillating winding mass (1) and comprising an attachment (6), which is circular and is formed at a portion of a circumferential edge of the ring, for fixing on the movement, a heavy part allowing the oscillation of the mass (1) in response to the movement of the timepiece and to the force of gravity, wherein the method comprises a first step of manufacture of a main element (2) of the mass (1) in two superimposable parts (4, 5), a second step of manufacturing a decorative element (3), and a third step of assembling the main element (2) and the decorative element, (3) the decorative element (3) being held between the two parts (4, 5) by at least one end (11), the main element (2) comprising two superimposed parts (4, 5) connected one to the other, the decorative element (3) is held by the end (11) between the superimposed parts (4, 5) of the main element (2), and wherein the method further comprises forming the attachment (6), which is circular, at the portion of the circumferential edge of the ring, for fixing on the movement.

11. The method according to claim 10, wherein the method comprises a step wherein a metallic foam is formed in order to obtain the decorative element (3), the decorative element (3) being made from amorphous or at least partially amorphous metal.

12. The method according to claim 10, wherein the method comprises a formation step wherein a metal plate is provided with an open pattern in order to obtain the decorative element (3), the decorative element (3) made from amorphous or at least partially amorphous metal.

13. The method according to claim 10, wherein the two parts (4, 5) of the main element (2) and the decorative element (3) are assembled by a hot thermoforming method of the hot-forming type or by insert moulding.

* * * * *